(12) United States Patent
Citerin

(10) Patent No.: US 10,410,065 B2
(45) Date of Patent: Sep. 10, 2019

(54) DYNAMIC PARAMETRIZATION OF VIDEO CONTENT ANALYTICS SYSTEMS

(71) Applicant: CANON KABUSHIKI KAISHA, Tokyo (JP)

(72) Inventor: Johann Citerin, Cesson-Sevigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 15/656,923

(22) Filed: Jul. 21, 2017

(65) Prior Publication Data
US 2018/0032819 A1 Feb. 1, 2018

(30) Foreign Application Priority Data
Jul. 26, 2016 (GB) .................................. 1612937.1

(51) Int. Cl.
*G06K 9/00* (2006.01)
*G06K 9/66* (2006.01)

(52) U.S. Cl.
CPC ........... *G06K 9/00771* (2013.01); *G06K 9/66* (2013.01)

(58) Field of Classification Search
CPC ......... G06K 9/00; G06K 9/66; G06K 9/00771
See application file for complete search history.

(56) References Cited

U.S. PATENT DOCUMENTS

| | | | | | |
|---|---|---|---|---|---|
| 3,617,631 | A | * | 11/1971 | Soames | G01N 15/1475 327/70 |
| 5,875,305 | A | * | 2/1999 | Winter | G06F 17/30017 348/262 |
| 7,961,946 | B2 | * | 6/2011 | Hammadou | G06K 9/468 348/143 |
| 8,868,555 | B2 | * | 10/2014 | Erol | G06F 17/30247 707/736 |
| 9,886,845 | B2 | * | 2/2018 | Rhoads | G06F 17/30241 |
| 9,916,538 | B2 | * | 3/2018 | Zadeh | G06N 7/005 |
| 10,074,031 | B2 | * | 9/2018 | Krenzer | G06K 9/00335 |
| 2006/0068513 | A1 | * | 3/2006 | Funakubo | C23C 16/52 438/14 |
| 2009/0167942 | A1 | * | 7/2009 | Hoogenstraaten | H04N 7/24 348/500 |
| 2013/0176430 | A1 | * | 7/2013 | Zhu | G06T 7/254 348/143 |

(Continued)

*Primary Examiner* — Anand P Bhatnagar
(74) *Attorney, Agent, or Firm* — Canon U.S.A., Inc. IP Division

(57) ABSTRACT

A method of parametrizing a video surveillance system comprising a current video content analytics module, a reference video content analytics module, and a video streaming component, the reference video content analytics module having higher performance than the current video content analytics module, the current video content analytics module processing video data transmitted by the video streaming component, includes the steps of obtaining, by the current video analytics module, first video data having first characteristics and analysing the first video data so as to obtain a first performance value, obtaining, by the reference video content analytics module, second video data having second characteristics and analysing the second video data to obtain a second performance value, comparing the first performance value with the second performance value, and, adapting configuration parameters of the video surveillance system based on the comparison result.

20 Claims, 6 Drawing Sheets

(56) References Cited

U.S. PATENT DOCUMENTS

| | | |
|---|---|---|
| 2015/0139500 A1 | 5/2015 | Gerster et al. |
| 2015/0365725 A1* | 12/2015 | Belyaev ............... H04N 21/458 725/46 |
| 2016/0275376 A1* | 9/2016 | Kant ..................... G06K 9/6277 |
| 2016/0321889 A1* | 11/2016 | Gagvani ................. G06T 7/254 |
| 2017/0039452 A1* | 2/2017 | Osindero ................. G06K 9/82 |
| 2018/0129892 A1* | 5/2018 | Bahl .................. G06K 9/00711 |
| 2018/0189600 A1* | 7/2018 | Astrom ................ G06K 9/6202 |

* cited by examiner

DYNAMIC PARAMETRIZATION OF VIDEO CONTENT ANALYTICS SYSTEMS

CROSS REFERENCE TO RELATED APPLICATION

This application claims the benefit under 35 U.S.C. § 119(a)-(d) of United Kingdom Patent Application No. 1612937.1, filed on Jul. 26, 2016 and entitled "Dynamic parametrization of video content analytics systems". The above cited patent application is incorporated herein by reference in its entirety.

FIELD OF THE INVENTION

The present invention relates to the technical field of video surveillance systems and more particularly to a method and a device for dynamically parameterizing video content analytics algorithms and/or devices.

BACKGROUND OF THE INVENTION

Video surveillance is currently a fast-growing market tending to become increasingly widespread for ubiquitous applications. It can be used today in numerous areas such as crime prevention, private and public areas for security purposes, abnormal events detection, traffic monitoring, customer behaviour, or general data gathering.

Despite an ever-increasing usage, mainstream video-surveillance has strong inherent limitations which lead to poor performance, in particular for solving crimes and offenses, due to the way it is used. Basically, video-surveillance consists in streaming camera footages to be recorded and displayed in real-time to human operators. Unfortunately, only a very limited fraction of camera images can be seen in real-time by humans, the remaining footage recordings being used after-action for batch or forensic activities. However, such a forensic after-action viewing is, in practice, rarely used, both, because it is often too late and useless at this point, and also because it is a time-consuming task to retrieve and track people like offenders across images from several cameras.

To cope with such difficulties, Video Content Analytics software modules (VCAs) have been developed to perform some automatic video analysis so as to trigger alarms, to make video surveillance far more real-time responsive, and to make it easier to exploit the after-action recorded footages, for example for forensic activities or for batch analysis tasks.

VCAs may be implemented within cameras themselves or within remote servers. Due to resource constraints, in particular of limited CPU power, the VCAs embedded within cameras are mainly used for simple tasks such as triggering alarm when virtual fences are crossed or triggering recording through motion detection. More complex tasks such as human searching, tracking and re-identification, 3D position estimation, advanced counting, face recognition, license plate recognition (LPR), gender and age detection, and abnormal behaviour detection can be handled when VCAs are embedded within remote servers.

The performances of the VCAs are directly linked to the conditions in which the images are acquired and to the settings of the VCAs that should be adapted to the scene.

However, it is to be noted that the settings of the VCAs are generally fixed and determined by specialized installers, so as to be finely tuned, which means that each time a VCA is to be re-set, a specialized installer should be present. As a consequence, the settings of the VCAs are not modified as a function of the condition changes. For example, variations related to light conditions (e.g. day/night and rain/sun) and to the number of targets to be identified and/or tracked in images have a huge impact on VCA's performances and resource consumption.

Accordingly, there is a need for a dynamic adaptation of the settings of the VCAs, allowing modification of the settings of the VCAs and/or of the system in real-time so as to get the best from each VCA with the available resources. Such an automatic process is referred to as "dynamic auto-setting" in the following.

There are basically three different approaches for automatically changing the settings of the VCAs:
  the possible settings are predetermined and their change is scheduled. It is referred to as an open-loop control;
  the possible settings are predetermined and chosen in real-time as a function of the scene analysis. In other words, settings are chosen as a function of a scene classification;
  the settings are tuned as a function of measures of VCA's output, in real-time, so as to obtain optimal results. It is referred to as a VCA feedback closed-loop control.

FIG. 1, comprising FIGS. 1a, 1b, and 1c, illustrates schematically the open-loop control, the scene classifier-based control, and the close-loop control, respectively.

According to the open-loop control, the changes in the environment that have an effect on the scene characteristics, in terms of VCA's behaviour, are predictable and thus, corresponding changes in the settings of the VCAs can be scheduled. For the sake of illustration, the parameters on which changes of the VCA's settings are based can be a day/night indication, sun brightness seasonal statistics, an estimated brightness as obtained from weather forecast, target density estimations based on traffic knowledge or traffic statistics, and a week/weekend day indication.

As illustrated in FIG. 1a, a model is used to calculate the most appropriate values of the settings to be used for one or several VCAs.

A main issue with open-loop control is that open-loop models are known to be efficient only in constrained or predictable environments.

For the scene classifier-based control, determining the values of the settings to be used requires obtaining measures of the scene, characterizing the scene, and using a model making it possible to choose reliably settings of the VCAs as a function of these measures. To be efficient, the measures may need to be obtained through dedicated sensors which increase the costs of the system.

As illustrated in FIG. 1b, a model is used to identify, as a function of environment measurements, the settings to be used for one or several VCAs. According to particular implementations, the models may be modified or may learn from VCA's behaviour.

The closed-loop control requires a controller and VCA feedbacks. VCA feedbacks comprise real-time information directed to resource consumption, that is easy to obtain, and VCA accuracy, that is difficult to measure (it results from comparing VCA results to an absolute reference referred to as a ground truth). As illustrated in FIG. 1c, the controller changes VCA's settings as a function of the measured VCA's output. There exist several types of controllers for closed-loop control:
  offline model-based controllers which are able to steer a system optimally by using a robust model which was derived offline beforehand;

adaptive model-based controllers which are able to draw or modify a model in-situ as a function of some measurements; and simple model-based controllers (since the closed-loop control is robust, approximate models or even no model can be used).

However, in reason of the complexity of the VCAs and their intricate dependency on the environment, the models that are required for open-loop control, scene-classifier-based control and closed-loop control (including the most simple models) are either too complex, or are useless without minimal knowledge of VCA's behaviour. Moreover, they are very difficult to link to realistic measurements of environment.

Furthermore, it is to be noted that a realistic dynamic VCA auto-setting or parametrization solution has to work in real-time. Thus, the dynamic auto-setting layer itself should use a negligible amount of resources as compared to the VCAs themselves since the aim of using specific settings is generally to get a maximum accuracy from VCAs with a limited amount of available resources.

Accordingly, all the known solutions have drawbacks and thus, there is a need to improve these solutions.

SUMMARY OF THE INVENTION

The present invention has been devised to address one or more of the foregoing concerns.

In this context, there is provided a solution for dynamically parameterizing video content analytics algorithms and/or devices.

According to a first object of the invention, there is provided a method for parametrizing a video surveillance system comprising a current video content analytics module, a reference video content analytics module, and a video streaming component, the reference video content analytics module having higher performance than the current video content analytics module, the current video content analytics module processing video data transmitted by the video streaming component, the method comprising:

obtaining, by the current video analytics module, first video data having first characteristics;

analysing the first video data having first characteristics, by the current video content analytics module, so as to obtain a first performance value;

obtaining, by the reference video content analytics module, second video data having second characteristics, the second video data being transmitted by the video streaming component;

analysing the second video data having second characteristics, by the reference video content analytics module, so as to obtain a second performance value;

comparing the first performance value with the second performance value; and, adapting configuration parameters of the video surveillance system based on the comparison result.

Accordingly, the method of the invention makes it possible to dynamically modify cameras and VCA settings, so as to provide improved results. It makes it possible to steer the video surveillance system to react to long-term and short-term (e.g. 10 minutes) drifts, as well as to long-term or short-term environment modifications. It is a generic approach, which works with any VCA, without need for human intervention. Since it is based on real-world testing, it gives predictions and settings changes a high level of confidence. It has a negligible impact on resource consumption. When using batch processing, it may even be used with no dedicated resource at all.

In an embodiment, the adapting step comprises a step of selecting a profile among a plurality of profiles, each profile of the plurality of profiles comprising configuration parameters of the current video content analytics module.

In an embodiment, the step of analysing the first video data having the first characteristics comprises a step of analysing the first video data for each profile of the plurality of profiles and a step of obtaining a first performance value for each profile of the plurality of profiles and the step of selecting a profile comprises a step of determining a profile associated with an optimal accuracy among a plurality of accuracies, each accuracy of the plurality of accuracies being associated with a different profile.

In an embodiment, each accuracy of the plurality of accuracies is determined as a function of the first performance value associated with one profile and of the second performance value.

In an embodiment, the method further comprises a step of obtaining a level of required resources for each profile of the plurality of profiles, the step of selecting a profile being further based on a level of required resources associated with a profile of the plurality of profiles.

In an embodiment, configuration parameters of the current video content analytics module are modified if the selected profile is repeatedly selected.

In an embodiment, configuration parameters of the current video content analytics module are modified if a difference between a score associated with the selected profile and a score associated with the configuration parameters of the current video content analytics module is greater than a predetermined threshold.

In an embodiment, the reference video content analytics module provides responses of higher quality than responses provided by the current video content analytics module.

In an embodiment, the reference video content analytics module for analysing the second video data requires more resources than the current video content analytics module for analysing the first video data.

In an embodiment, the first video data are derived from the second video data, the first video data being of lower quality than the second video data.

In an embodiment, the first video data are transmitted by the video streaming component, the first video data being of lower quality than the second video data.

In an embodiment, the steps of analysing the first video data and of analysing the second video data are carried out on a batch mode, when the current video content analytics does not process real-time data.

According to a first object of the invention, there is provided a device for parametrizing a video surveillance system comprising a current video content analytics module, a reference video content analytics module, and a video streaming component, the reference video content analytics module having higher performance than the current video content analytics module, the current video content analytics module processing video data transmitted by the video streaming component, the device comprising a microprocessor configured for carrying out the steps of:

obtaining, by the current video analytics module, first video data having first characteristics;

analysing the first video data having first characteristics, by the current video content analytics module, so as to obtain a first performance value;

obtaining, by the reference video content analytics module, second video data having second characteristics, the second video data being transmitted by the video streaming component;

analysing the second video data having second characteristics, by the reference video content analytics module, so as to obtain a second performance value;

comparing the first performance value with the second performance value; and, adapting configuration parameters of the video surveillance system based on the comparison result.

Accordingly, the device of the invention makes it possible to dynamically modify cameras and VCA settings, so as to provide improved results. It makes it possible to steer the video surveillance system to react to long-term and short-term (e.g. 10 minutes) drifts, as well as to long-term or short-term environment modifications. It is a generic approach, which works with any VCA, without need for human intervention. Since it is based on real-world testing, it gives predictions and settings changes a high level of confidence. It has a negligible impact on resource consumption. When using batch processing, it may even be used with no dedicated resource at all.

In an embodiment, the microprocessor is further configured so that the adapting step comprises a step of selecting a profile among a plurality of profiles, each profile of the plurality of profiles comprising configuration parameters of the current video content analytics module.

In an embodiment, the microprocessor is further configured so that, the step of analysing the first video data having the first characteristics comprises a step of analysing the first video data for each profile of the plurality of profiles and a step of obtaining a first performance value for each profile of the plurality of profiles; and the step of selecting a profile comprises a step of determining a profile associated with an optimal accuracy among a plurality of accuracies, each accuracy of the plurality of accuracies being associated with a different profile.

In an embodiment, the microprocessor is further configured so that each accuracy of the plurality of accuracies is determined as a function of the first performance value associated with one profile and of the second performance value.

In an embodiment, the microprocessor is further configured so as to carry out a step of obtaining a level of required resources for each profile of the plurality of profiles, the step of selecting a profile being further based on a level of required resources associated with a profile of the plurality of profiles.

In an embodiment, the microprocessor is further configured so that configuration parameters of the current video content analytics module are modified if the selected profile is repeatedly selected.

In an embodiment, the microprocessor is further configured so that configuration parameters of the current video content analytics module are modified if a difference between a score associated with the selected profile and a score associated with the configuration parameters of the current video content analytics module is greater than a predetermined threshold.

In an embodiment, the microprocessor is further configured so that the reference video content analytics module provides responses of higher quality than responses provided by the current video content analytics module.

In an embodiment, the reference video content analytics module for analysing the second video data requires more resources than the current video content analytics module for analysing the first video data.

In an embodiment, the first video data are derived from the second video data, the first video data being of lower quality than the second video data.

In an embodiment, the first video data are transmitted by the video streaming component, the first video data being of lower quality than the second video data.

In an embodiment, the microprocessor is further configured so that the steps of analysing the first video data and of analysing the second video data are carried out on a batch mode, when the current video content analytics does not process real-time data.

Optional features of the methods and devices are defined in the dependent claims. Some of them are explained below with respect to the methods. However they can also apply to the corresponding devices.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Other features and advantages of the invention will become apparent from the following description of non-limiting exemplary embodiments, with reference to the appended drawings, in which:

FIG. 1, comprising

DETAILED DESCRIPTION OF EMBODIMENTS OF THE INVENTION

Figure 1A:
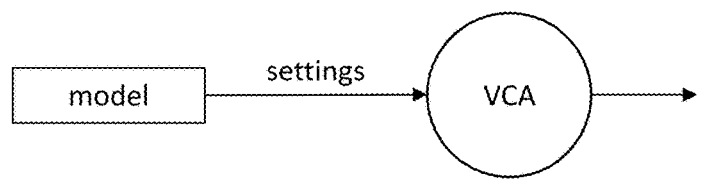
FIGS. 1a, 1b, and 1c, illustrates schematically the open-loop control, the scene classifier-based control, and the close-loop control, respectively.
Figure 1B:
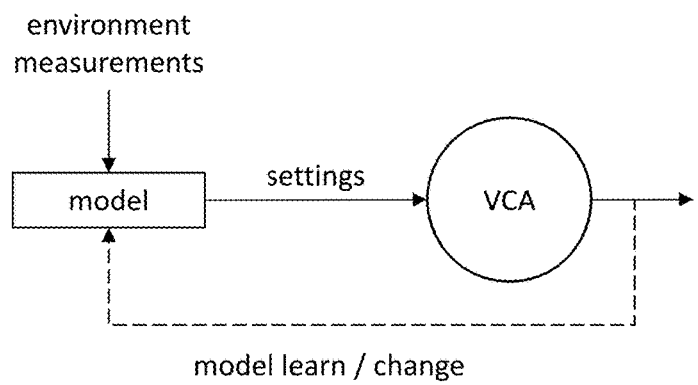
Figure 1C:
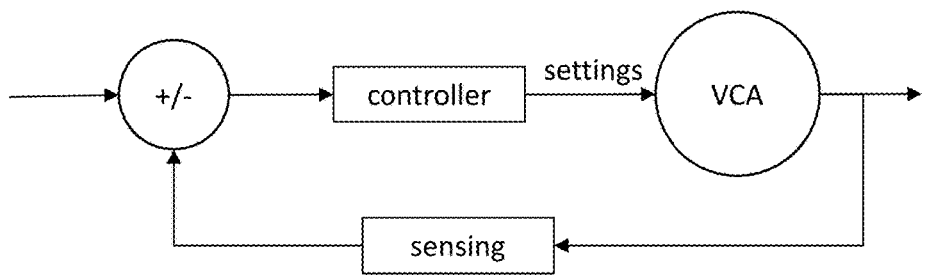

Particular embodiments of the invention are based on a sporadic reference-based sensing and on a sporadic sandbox-based prediction that both make it possible to adapt dynamically settings of current real-time VCAs. Reference-based sensing measurements are used for estimating VCA accuracy while sandbox-based prediction provides efficient an in-situ testing results.

Sporadic reference-based sensing measurements are based on data obtained sporadically and on the result of a comparison between the output of a current VCA using current settings and the output of a reference VCA, both of these VCAs preferably using the obtained data (transcoded if needed).

Similarly, sporadic sandbox-based VCA estimations are based on data obtained sporadically (e.g. the same data as the one obtained for the sporadic reference-based sensing measurements) and on the result of a comparison between the output of sandbox VCAs, using different settings than the current VCA, and the output of the reference VCA, both of these VCAs preferably using the obtained data (transcoded if needed). Different sets of settings may be tested in an independent sandbox to get corresponding VCA accuracy and resource consumption prediction with high level of confidence.

A controller may select a most appropriate profile based on current VCA results and profile predicted results.

As mentioned above, the data used for reference-based sensing measurements and for sandbox-based VCA estimations are obtained sporadically, with a sampling time (e.g. one minute) that is appropriate to the closed-loop control of environment changes, which typically have a relaxation time of at least ten minutes.

According to embodiments of the invention, processing is performed as a batch task, with no regular scheduling, by using the unused resource of the current real-time VCA itself.

For the sake of clarity, it is assumed that a real-time VCA is a VCA used in a video surveillance system to process real-time data;

the current real-time VCA is the VCA to be dynamically parametrized, processing real-time data and producing current real-time results;

the current VCA is a VCA having the same settings as the current real-time VCA, that preferably does not process real-time data but that processes data used for estimating the accuracy of the current real-time VCA. It produces current results;

a sandbox VCA is a VCA having settings different than the ones of the current real-time VCA, that does not process real-time data but that processes data used for estimating the accuracy of the current real-time VCA. It produces prediction results associated with settings (a set of settings being referred to as a profile); and the reference VCA is a VCA having optimized settings that preferably processes high-quality data, the reference VCA being used to produce reference results that are used to determine a relative accuracy of a VCA. The performance of the reference VCA is higher than the performance of the current real-time VCA, of the current VCA, and of a sandbox VCA, for example in terms of quality of results. However, the reference VCA requires more resources and/or time to provide results than the current real-time VCA, of the current VCA, and of a sandbox VCA. In other words, the probability that results obtained from the reference VCA correspond to the reality is higher than the one associated with the current VCA. It is also to be noted that the reference VCA may correspond to the current real-time VCA with particular setting values.

It is to be noted that a VCA being typically a software module, the current real-time VCA, the current VCA, a sandbox VCA, and the reference VCA can be considered as different instantiations of the same module or as being the same module with different parameters and/or different inputs.

Figure 2:
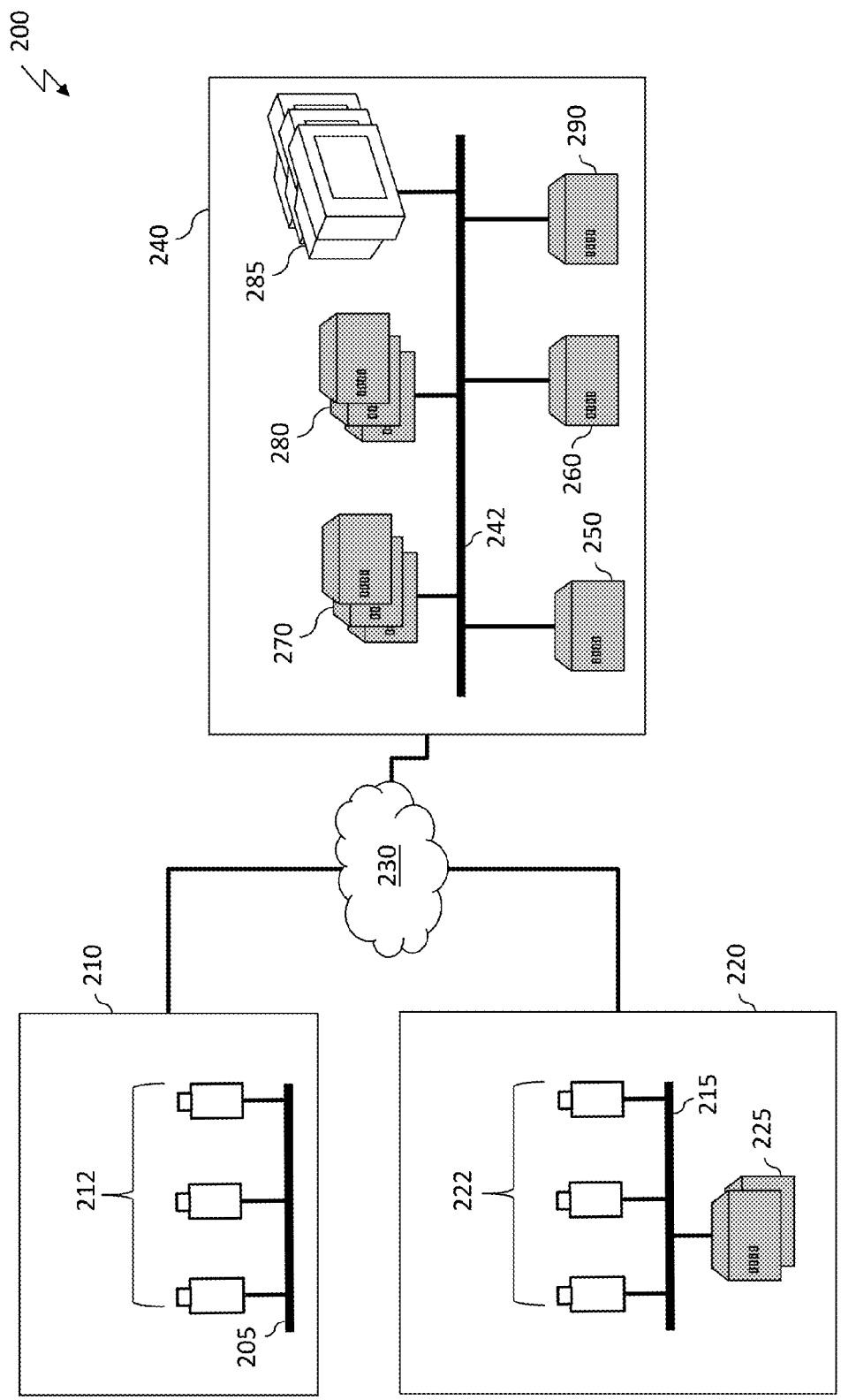
FIG. 2 is a schematic representation of an example of architecture of a video surveillance system.

FIG. 2 is a schematic representation of an example of architecture of a video surveillance system wherein the invention may be implemented.

In the represented architecture, the video surveillance system 200 is composed of two remote sites 210 and 220, one central site (also called headquarters) 240 and a backbone network 230 which interconnects remote sites and the central site.

The first remote site 210 contains, in the represented example, a set of cameras 212 interconnected by a dedicated infrastructure network 205. The dedicated infrastructure network 205 of the first remote site 210 is typically a Local Area Network (LAN) based on a hierarchical architecture with 10/100/1000 Mbps Gigabit Ethernet, RJ-45 using Ethernet switches. The set 212 contains standard cameras and/or cameras embedding VCAs.

The second remote site 220 contains a set of cameras 222 and a set of recording servers 225 interconnected by a dedicated infrastructure network 215. The dedicated infrastructure network 215 of the second remote site 220 is typically a Local Area Network (LAN) based on hierarchical architecture with 10/100/1000 Mbps Gigabit Ethernet, RJ-45 using Ethernet switches. The set 222 contains standard cameras and/or cameras embedding VCAs. The set 225 contains recording servers and/or recording servers embedding VCAs.

The set of the recording servers 225 is typically configured to store the video flows of the set of cameras 222.

The central site contains a Video Manager System (VMS) 250 configured to manage the video surveillance system, a system analyser 260 configured to monitor the resources of the video surveillance system, an auto-setting server 290 configured to determine the particular strategies if needed, a set of recording server 270 configured to store the received video streams, a set of Video Content Analytics (VCA) 280 configured to analyse the received video streams and a set of viewers 285 configured to display received video streams, all the modules being interconnected by a dedicated infrastructure network 242. The dedicated infrastructure network 242 of the central site is typically a Local Area Network (LAN) based on hierarchical architecture with 10/100/1000 Mbps Gigabit Ethernet, RJ-45 using Ethernet switches.

The network deployment of the video surveillance system represented in FIG. 2 is a non-limiting example of a system which can implement an embodiment of a method according to a first aspect of the invention, or that may be configured to form a video surveillance system according to another aspect of the invention.

Embodiments of the invention may be used for different types of network deployments. For instance, for a video surveillance system containing a central site and several remote sites 210, the deployment is called "centralized deployment". For a video surveillance system containing a central site and several remote sites 220, the deployment is called "distributed deployment".

The set of recording servers 270 may be configured to store video flows that are not already stored in a remote site. For instance, in the video surveillance system 200, the remote site 210 does not comprise recording servers and consequently, the set of recording servers 270 may be used to record video flows issued from the set of cameras 212.

According to particular embodiments, the set of VCA servers 280 contains the VCA software modules which are configured to process video flows.

The Video Manager System 250 is a device containing the software module which configures, controls and manages the video surveillance system. It is may be controlled via an administration interface. In particular, this interface comprises a list of the devices or modules of the video-surveillance system such as cameras, recording servers, and VCA servers. Each device or module may be set up via the interface. The Video Manager System 250 also manages all video streams. For instance, the characteristics of each video stream are set up via the Video Manager System 250. More particularly, the administrator initially configures (i.e. predefines) the target (initial) characteristics for all video streams. Moreover, for each stream, the administrator decides whether the characteristics are fixed or modifiable.

Figure 3:
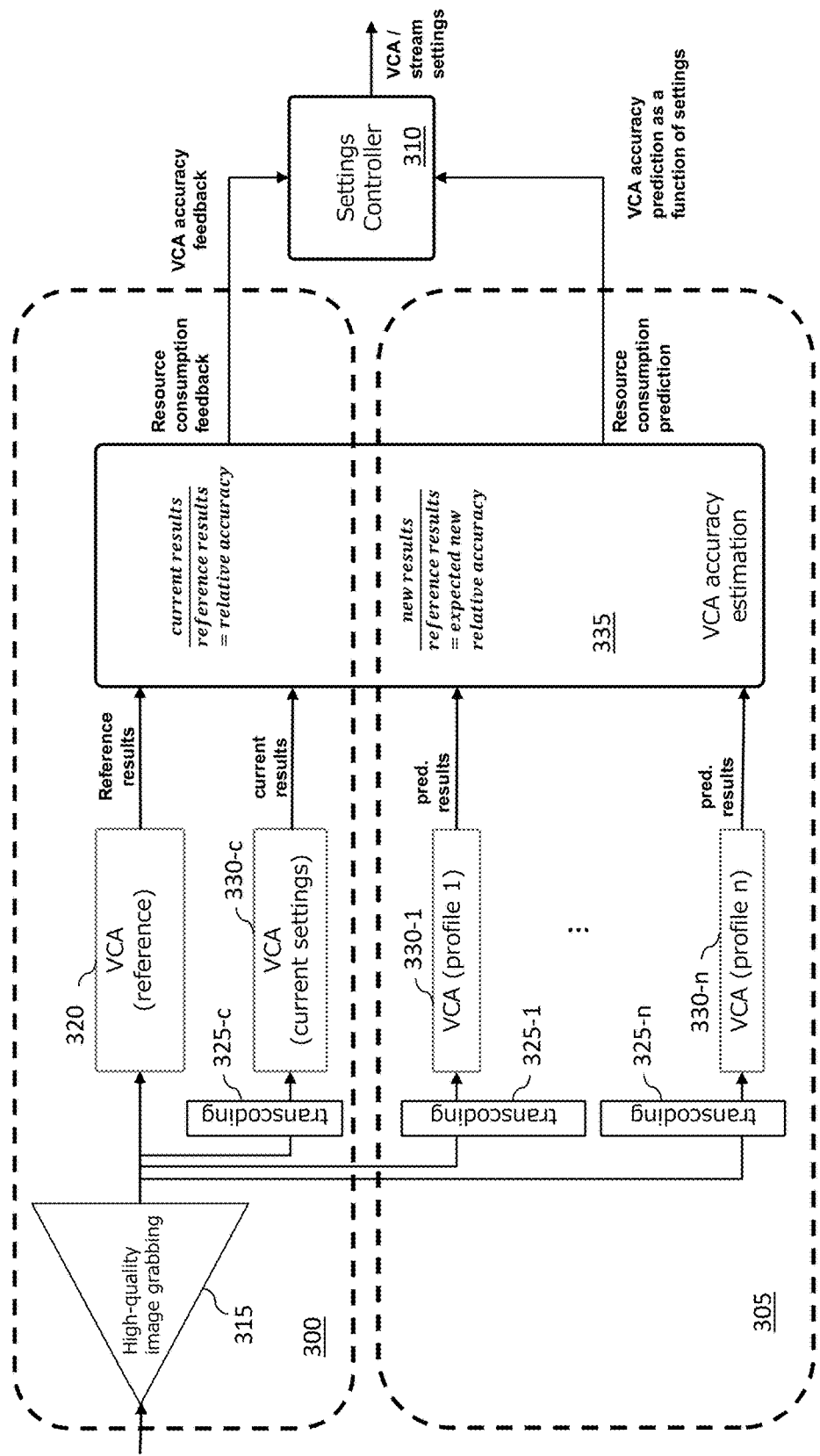
FIG. 3 is a block diagram illustrating an example of a logical architecture of VCA processing according to embodiments of the invention.

FIG. 3 is a block diagram illustrating an example of a logical architecture of VCA processing according to embodiments of the invention.

As illustrated, the logical architecture comprises three main blocks 300, 305, and 310 that are directed to sporadic reference-based sensing, sporadic sandbox-based prediction, and settings control, respectively.

Sporadic reference-based sensing block 300 aims at estimating resource consumption and at computing a relative VCA accuracy by comparing VCA results obtained from a current VCA (having the current settings) with VCA results obtained from a reference VCA.

As illustrated in Table 1 of the Appendix, non-physical settings may include some image-quality-related settings (also called stream settings) as well as VCA-related settings (also called VCA settings). Among the settings, some of the stream settings of the reference VCA, such as resolution or encoding parameters, correspond to a particular image quality, which may be different from the one of the current real-time VCA images.

Tables 2a and 2b illustrate two examples of setting profiles having different values. For the sake of illustration, stream values of profile 1 (Table 2a) correspond to high quality images, a video stream having a frame rate of 25 frames per second, and frames having a resolution of 1080 p while the VCA values of this profile correspond to a character size of 96 pi, a stop criterion of 2 s, and thresholds set to 180 and 260. Still for the sake of illustration, stream values of profile 2 (Table 2b) correspond to low quality images, a video stream having a frame rate of 15 frames per second, and frames having a resolution of 720 p while the VCA values of this profile correspond to a character size of 72 pi, a stop criterion of is, and thresholds set to 120 and 140.

For estimating resource consumption and computing a relative VCA accuracy, a high-quality image is grabbed (e.g., from a video stream), as illustrated with reference 315, and used in the reference VCA (reference 320) to obtain reference results.

If needed, the obtained high-quality image is transcoded (reference 325-c), for example to decrease the spatial and/or the coding resolution, and the transcoded image is processed by the current VCA (reference 330-c), using current settings, to obtain current results. Such transcoding corresponds to the adaptation of the stream settings to the current settings.

As illustrated, the current results obtained from the current VCA (having the current settings) are compared with the reference results obtained from the reference VCA in a VCA accuracy estimation module 335.

Likewise, sporadic sandbox-based prediction block 305 aims at estimating resource consumption and at computing a relative VCA accuracy by comparing VCA results obtained from a sandbox VCA set according to one of a set of several predetermined setting profiles, for each profile of this set of profiles, with the reference results obtained from the reference VCA.

Again, if needed, the obtained high-quality image is transcoded (reference 325-i), for example to decrease the spatial and/or the coding resolution, and the transcoded image is processed by a sandbox VCA. For the sake of illustration, it is assumed that the set of setting profiles comprises n profiles. For each sandbox VCA, the transcoding corresponds to the adaptation of the stream settings to each profile.

As illustrated, the VCA results obtained for each setting profile of the set of profiles are compared with the reference results obtained from the reference VCA in the VCA accuracy estimation module 335.

The relative accuracies associated with the current settings and with the settings of each profile of the set of profiles are then compared to each other, preferably taking into account the resource consumption, to determine whether or not the current settings are to be changed and, if appropriate, which setting profile is to be used. This is done in the settings controller 310.

It is to be noted here that a valid reference VCA should provide results with a higher quality than the VCAs used in real-time in the video surveillance system and should be more robust than the latter (i.e. it should be adapted to many more environments and situations). Therefore, none of the VCAs used in real-time in the video surveillance system can be used as a valid reference VCA. Indeed, in order to be efficient in terms of quality and resource consumption, trade-offs are done in the real-time VCAs (many assumptions are done, corresponding to particular settings choices and dedicated thresholds, so as to obtain good results with a low level of resources).

Therefore, the reference VCA is a huge consumer of resources.

It is also to be noted that transcoding images and predicting VCA results, in particular for different setting profiles, need resources and take time.

To cope with such requirements (i.e. using one very demanding VCA (reference VCA), using many standard VCAs (sandbox VCAs), and transcoding images), measurements and control are sporadic.

Moreover, it has been observed by the inventors that the used settings should not change too often to avoid instability during change and to take into account the fact that the environment conditions do not change very quickly. Therefore, one high-quality image can be grabbed, for example, every minute. This is several orders of magnitude less than the frame rate required to run a real-time VCA. So, although sensing uses high-complexity algorithms, global resource consumption should remain negligible as compared with the resources used by the real-time VCAs.

Since the VCA-dedicated resources are usually quite fixed, with a dedicated hardware and since each image is different from another image, the time required to process images in a VCA varies significantly. In addition, for stability purposes, there is always at least a small margin with CPU or other resources, which are normally not 100% used unless an activity pike arises. Therefore, it is possible to make measurements and control, for dynamically parametrizing the VCAs, as batch tasks, these tasks having a low priority over the real-time VCAs. Accordingly, the resources which are temporarily not used by the system for real-time VCA purpose can be used for measurements and control. There is no significant impact on the system stability since the low priority of these batch tasks lets the resource margin to be still effective.

Figure 4:
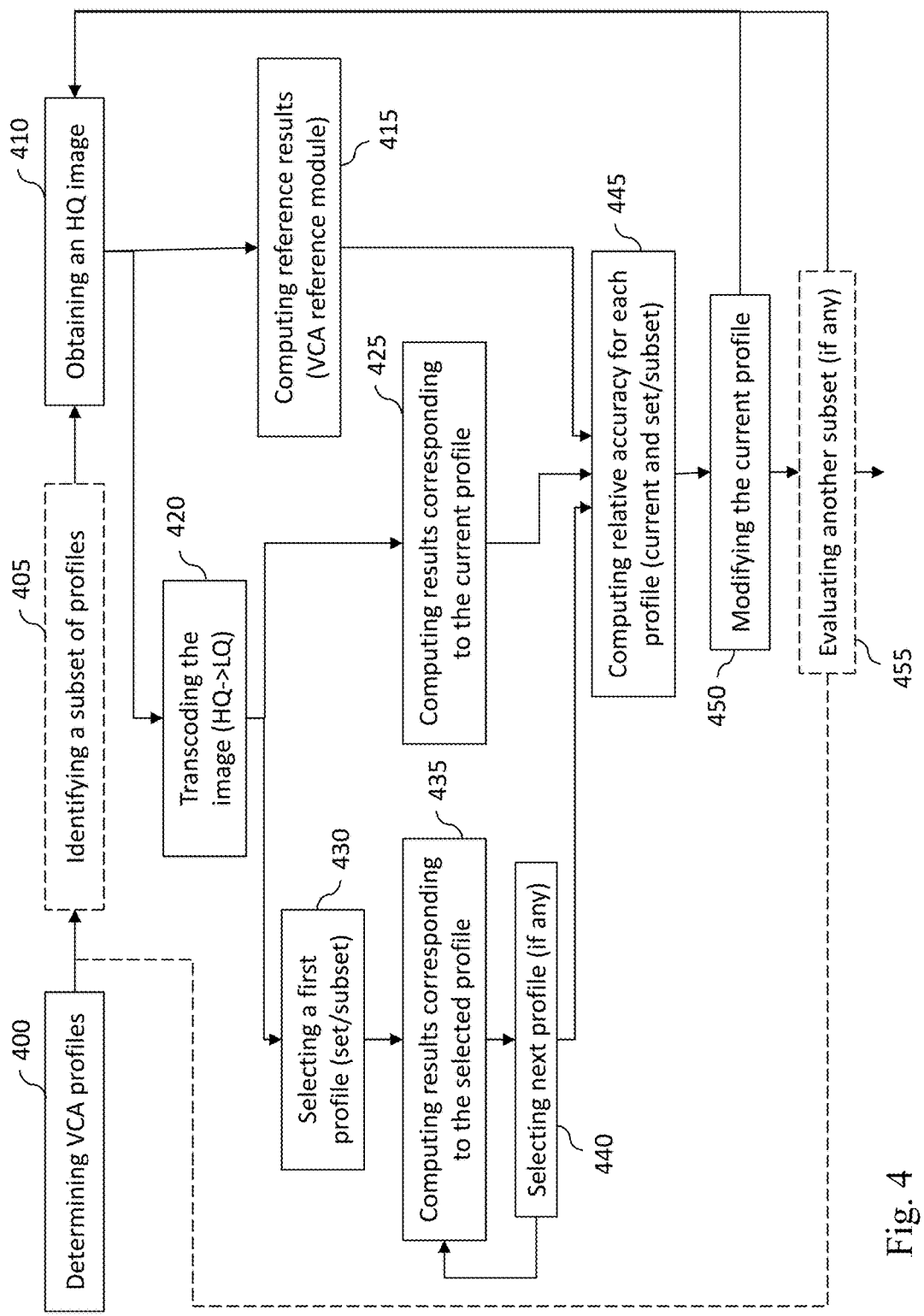
FIG. 4 illustrates an example of steps of a method according to embodiments of the invention for estimating the efficiency of a current real-time VCA and dynamically parametrizing the current real-time VCA.

FIG. 4 illustrates an example of steps of a method according to embodiments of the invention for estimating the efficiency of a current real-time VCA and dynamically parametrizing the current real-time VCA.

As illustrated, a first step is directed to the determination of possible profiles for a current real-time VCA (step 400).

It is recalled that there exist many different settings for a system comprising one camera and one VCA system such as the physical camera settings (e.g., gain, shutter speed, aperture, and zoom level), the stream settings (e.g., image resolution and image encoding parameters such as quality and GOP size), and the VCA settings. The latter depend on the VCA but usually have several different variables corresponding to thresholds or other predefined settings. For the sake of illustration, in the case of one typical LPR (License Plate Recognition) VCA, such parameters may comprise values such as a maximum size of characters, a minimum size of characters, a score rejection threshold, a time limit, and an area of interest.

It has been observed that physical camera settings are not suited for dynamical parametrization of the system since they correspond to the physical modification of the sensor itself and since it is not possible to use images obtained with the real settings to infer images obtained with other settings by performing an equivalent of "transcoding".

However, it is to be noted that most current cameras are already able to automatically set focus/gain/aperture to maximize image quality. Moreover, if cameras are not equipped with physical auto-setting or parametrization capabilities, there exist techniques related to pure image analysis to detect and possibly achieve physical setting optimization. This is done without reference to any VCA and so, without the need to compare different VCA results.

Many VCA settings exist, each having many possible values. Accordingly, although it would be theoretically possible to test all of possible setting value combinations, it is not possible in practice due to combinatorial explosion.

However, it has been observed that only few combinations are consistent. Therefore, a valid set of settings should be determined to create a VCA that is optimal in particular situations. If the actual environment corresponds to one of these situations, the corresponding setting values should be selected. If it corresponds to another situation, other settings, which are optimal for this other situation, should be selected instead. Such setting values associated with one environment or situation are referred to as a setting profile. A profile encompasses specific values for all settings of interest (e.g. resolution, encoding, and VCA). Another profile will have other values for those settings.

Only a few clearly different situations should get dedicated profiles. There is a quite high natural variance in results expected for one situation, thus it is not useful to fine-adjust settings if the situation does not evolve sharply enough. Moreover, changing settings too often creates instability, so profiles should really correspond to clearly different situations. Therefore, only a limited number of profiles should be used.

According to particular embodiments, each profile corresponds to a particular set of values for all the settings of the VCA (or for the main settings of the VCA) and a profile is determined for each type of environment.

A simple method for creating profiles is to create them manually, one for each typical situation (e.g. rain, high density of targets, low light, and so on). Other methods exist, in particular for creating profiles automatically. Some of them may be based on a uniform segmentation of the settings manifold.

Whatever the used method is, it is possible to draw a complete list of possible profiles beforehand, for all main situations (typically a few dozen), including the profiles adapted for dynamically changing situations. It is always possible to create this list of all profiles manually at a limited cost.

According to particular embodiments, if many profiles exist, only a subset of the profiles, comprising the most relevant profiles, is automatically selected (step 405). Indeed, among the profiles of the list, some of them correspond to scenes that cannot be viewed by the particular camera capturing the images analysed by the VCA. Therefore, only few different environments are possible for each particular camera and thus, only few different profiles are consistent.

In order to avoid testing all the profiles of the set of profiles, it is possible to select the profiles during a fixed auto-setting step. Alternatively, all the profiles may be selected in a first phase and then, the profiles that are never used or not used very often are discarded from the list. In order to reduce processing time initially, only some subsets of profiles may be selected. The subset that is selected for being used may be changed randomly, until statistics of use are available for each profile, allowing discarding of the useless profiles. For the sake of illustration, the profiles that are used less than a predetermined threshold, for example 2%, after a predetermined period of use, are discarded from the list of profiles.

Turning back to FIG. 4, a high-quality image is grabbed (step 410).

It is to be noted that the reference VCA requires high-quality images, better quality as compared to those used in real-time VCAs. This requires grabbing different images (e.g., similar images of different quality) than already provided to the real-time VCA channel. Differences between those high-quality images and the stream used by real-time VCAs are only directed to quality (e.g., resolution and encoding quality) and do not concern physical camera settings (e.g., shutter speed, zoom, and gain) and thus, it is possible to get such additional images with most of modern cameras.

Several solutions exist for grabbing these high-quality images used by the reference VCA (whose frame rate is far smaller than the one of the real-time VCAs), depending on the features of the cameras of the video surveillance system.

According to a particular embodiment, high-quality images are obtained on-demand. Such a feature is provided by numerous modern cameras complying with ONVIF (Open Network Video Interface Forum). In such a case, no additional stream is needed. Sporadic images, corresponding to the sporadic measurements, are transmitted on an image basis (i.e., not as a sequence of images) when needed. Such a solution is particularly easy to implement since images are requested asynchronously. Furthermore, it does not request the use of a buffer memory and it makes it possible to be sure that processing of the previous image ended before requesting another one.

According to another embodiment, several streams of images are used, using a feature provided by most of modern cameras enabling dual-stream or multiple-stream output.

Accordingly, it is possible to create a stream of high-quality images, having a small framerate that preferably corresponds to the measurement sampling time. If the lowest framerate achievable is higher than that, it is possible to get the lowest framerate and to discard the images that are not required, as a function of the measurement sampling time.

Still according to another embodiment that may be used when the camera does not make it possible to obtain on-demand images and does not provide dual- or multi-stream features, the recorded stream may be used. Usually, the recorded stream is intended to be used by humans for forensic uses or for other applications where it is important to be able to recognize targets on an image with sufficient details. The quality of the images in the recorded stream is generally higher than required by real-time VCAs and thus, these images are good candidates to be used by the reference VCA.

It is to be noted that transmission of high-quality images to the reference VCA does not increase significantly the used network bandwidth since the high-quality images are required at a very low framerate.

Moreover, it is possible to reduce even more network resource consumption by assigning to the stream or the on-demand images a low priority over the network since delay is not important, the image being analysed by the reference VCA in batch mode (with no need for specific time for result and no need for synchronization).

Therefore, the low framerate (sporadic image grabbing) combined with low priority features make the transmission of high-quality images to have negligible disturbances on the network.

As illustrated in FIG. 4, after grabbing a high-quality image, reference results are computed in the reference VCA (step 415). As described above, computing reference results is done as a batch task when needed resources are available.

It is to be noted that a good approximate of the reference VCA can be determined easily since it does not need to be the most accurate VCA. It just needs to be a good metrics to rank the different profiles with an appropriate ranking (there is usually a huge gap between any among the most accurate reference VCAs and a real-time VCA, i.e., a VCA using limited resources in a real-world application).

In most cases, it is possible to get a reference VCA a priori.

There exist VCAs that provide good results but that cannot be used for real application in view of real-time constraints. They use a huge amount of resources. Such high accuracy VCAs are ideal to be used for sporadic reference-based VCA accuracy measurement. For example, in the context of LPR (License Plate Recognition), MSER-based technique (Maximally Stable Extremal Images) combined with latest OCR (Optical Character Recognition) (like deep neural networks-based) are known to be near perfect at reading license plates, even in moderate tilting and blurring conditions (if trained with corresponding characters deformations). At least such advanced MSER-based LPRs are known to be much better than any commercial LPR. They are good candidates to be used as a reference VCA.

According to another embodiment, particular settings providing good results can be used to create the reference VCA. Indeed, "real-time usable" profiles are not the same as "most accurate" profiles. Many of the settings have well-known "max" setting values (e.g. the resolution (max resolution of the camera), the encoding quality (max), the time limit for iterative steps (no time limit), and so on). Such profiles may be used to create the reference VCA.

It has been observed that settings for which it is difficult to predetermine a max value, for example because they depend on the particular camera image context (e.g. the typical distances between camera/target), usually do not depend on dynamic environment parameters, only on static environment specificities of the camera. Such static related settings are fixed. Therefore, it is possible to get such reference VCA setting value by other static auto-setting means.

If it remains setting values that are difficult to determine (no known max or no fixed max), they are few and have a low impact on the accuracy of the VCA. Accordingly, they can be set as any average value or average value obtained through static auto-setting means.

Turning back to FIG. 4, after having obtained a high-quality image, while computing reference results, before or after, if the current real-time VCA (parametrized with the current profile) needs an image of lower quality than the grabbed high-quality (HQ) image, which is generally the case, the latter is transcoded (step 420) into a low-quality (LQ) image.

It is to be noted that using the transcoded image makes it possible to get a complete independency between the real-time VCA process and the measurement process, which is often preferable.

Moreover, it is observed that the transcoding step does not require any additional resource since it is required by the controller to evaluate different profiles as described hereafter be reference to step 435. It is also to be observed that re-running the current VCA on the transcoded image is negligible in terms of resource consumption since the real-time VCA currently used by the system requires usually much less resource as compared to the reference VCA.

Figure 5:
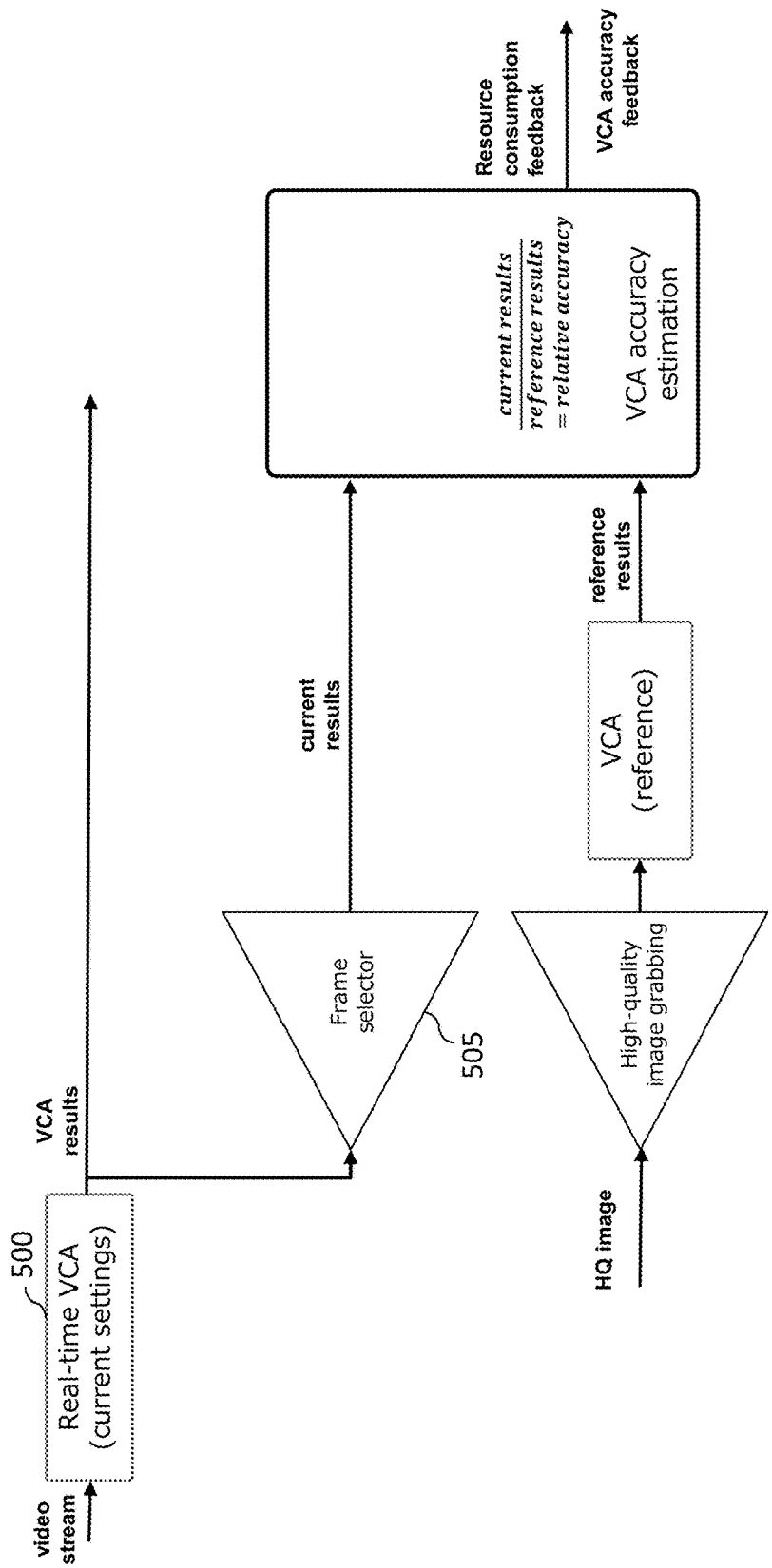
FIG. 5 represents a particular embodiment for computing the relative accuracy of a current real-time VCA in comparison with a reference VCA.

Alternatively, it is possible to use the VCA results of the current real-time VCA, obtained based on the real-time stream, for computing the relative accuracy of the VCA. Such a solution is illustrated in FIG. 5 representing a particular embodiment for computing the relative accuracy of the current real-time VCA (500) in comparison with the reference VCA.

As illustrated, a selector (505) is used to select the VCA results associated with an image of the real-time stream that corresponds to the grabbed high-quality image. This may be done by using a timestamp associated with the grabbed high-quality image, then retrieving the real-time stream image which has the nearest timestamp, and getting its corresponding VCA results.

However, such an embodiment may present drawbacks since it is possible that no image from the real-time stream corresponds precisely to the grabbed high-quality image, since streams may be quite independent one from the other. It is particularly true if the framerate (fps) of the real-time stream is low since the time difference (at) may reach up to half the time period corresponding to the framerate ($\Delta t = 1/2fps$). Even when they do correspond to very similar timeframes, the fact that images are different makes noise to be different and so, to be not comparable at all.

Moreover, such an embodiment requires to store images or at least timestamps of the real-time stream in a buffer and to use an additional frame retrieving process, which adds useless complexity. In addition, it requires a measurement process to interfere with the real-time VCA process.

Turning back to FIG. 4, after having obtained a high-quality image at step 410 and after having transcoded the latter at step 420, the profiles of the set of profiles or of the subset of profiles are tested to predict VCA results. They can be tested in a parallel way or one after another. For the sake of clarity, it is assumed here that they are tested sequentially in view of resource availability.

To that end, a first profile of the set or subset of profiles is selected (step 430).

Next, when resources are available, a sandbox VCA is configured according to the selected profile, and the corresponding VCA results are computed by processing the transcoded image (step 435).

The aim of step 435 is to evaluate the VCA results that would have been obtained if settings of the current VCA were set to the selected profile. In other words, it aims at evaluating current VCA accuracy for the selected profile. In order to compare the VCA results obtained with the current VCA, the evaluation is done on the same image as the one used by the current VCA and the same image (with a different quality) as the one used by the reference VCA.

Since each setting profile may have different stream settings (e.g. resolution and/or image quality), a specific transcoding step can be required (not represented) to transform the high-quality image into the appropriate low-quality image.

After having computed the VCA results for the selected profile, it is determined whether or not all the profiles of the set or subset of profiles have been tested. If all the profiles of the set or subset of profiles have not been tested, a non-tested profile is selected (step 440) and the corresponding VCA results are computed.

Next, in order to compare the VCA result accuracies, a relative accuracy is computed for the current settings and for each profile of the set or subset of profiles (step 445). It is to be observed that although the step of computing relative accuracy is illustrated after having computed VCA results for the current settings and for each profile of the set or subset of profiles, such a relative accuracy may be computed each time VCA results are obtained (and after reference results are obtained).

For the sake of illustration, a VCA of the LPR (License Plate Recognition) type is considered, assuming that
- the reference VCA detects 5 license plates denoted LP1 to LP5;
- a first VCA having settings corresponding to a first profile (profile p1) detects three license plates (LP1' . . . LP3'), of which only two correspond to LP3 and LP5 respectively. Therefore, in comparison to the results provided by the reference VCA (used as a ground truth), there are two true positive detections, one false positive detection, and two false negative detections among a total of five license plates to be found;
- a second VCA having settings corresponding to a second profile (profile p2) detects 7 license plates, of which three (LP1" . . . LP3") correspond to LP1, LP2, and LP4.

According to one embodiment, the relative accuracy is calculated on the basis of only the true positive detections. Therefore, in this example, in the case of profile p1, the relative accuracy may be calculated as 2/5=0.4. In the case of profile p2, the relative accuracy may be 3/5=0.6.

According to another embodiment, the relative accuracy is determined on a score basis. The score may consider good results (true positive detections) to be counted as positive contributions to the score, whereas errors (false positive detections) are counted as negative contributions to the score. Accordingly, the score associated with profile p1 may be calculated as F-score=(2−1)/5=0.2, whereas the score associated with profile p2 would be (3−4)/5=−0.2.

Still according to another embodiment, the score (F-score) may be determined as follows: F-score=2*precision*recall/(precision+recall), where 'precision' corresponds to the ratio of good results (based on the reference VCA) in view of the number of detections and the 'recall' corresponds to the number of good results (based on the reference VCA) in view of the number of detections to be made. Accordingly, this score can be determined as follows for profile p1: F-score=2*2/3*2/5/(2/3+2/5)=0.5 and as follows for profile p2: F-score=2*3/7*3/5/(3/7+3/5)=0.5.

In the following, each of these scores is referred to as a relative accuracy, not doing any assumption on the way it is calculated.

Turning back to FIG. 4, it is then determined whether or not the current settings should be changed and, if they should be changed, the new settings are determined (step 450). This is done by a setting controller based on VCA accuracy measurements and on profile accuracy predictions, that is to say on the relative accuracies computed at step 445.

It has been observed that simply choosing the profile which has provided the best VCA accuracy or the best combination of VCA accuracy and resource consumption each time a new measurement is done (similar to P-controller) is unstable, since settings might change very often. Such a solution is very sensitive to noise and measurement errors.

Therefore, the setting controller preferably implements mechanisms to avoid frequent setting changes. This can be done, for example, by taking into account several measurements (not only the last one).

According to a particular embodiment, the setting controller uses consensus-based heuristic algorithms according to which settings are changed if suggested ones are repeatedly better than current ones and better than any others in average. Such a heuristic can be expressed as follows:

$$\text{choose setting } x_m, \begin{bmatrix} \langle f(x_m) \rangle_n > \{\langle f(x_i) \rangle_n\}_{i \neq m} \\ f(x_m)(t) \geq f(x_c)(t) \forall\ t \in [t_0 - nT_s, t_0] \end{bmatrix}$$

wherein
- $x_c$ represents the current settings and $x_i$ represents a profile of index i;
- $f(x_m)(t)$ is a VCA score associated with a profile m at measurement sample time t and $f(x_i)(t)$ is a VCA score associated with a profile i at measurement sample time t. The VCA score may be the VCA relative accuracy or it can be a combination of the VCA accuracy and the VCA resource consumption in order to take into account resource consumption in the score itself;
- $T_s$ is the sampling time used by measurement and controller. According to a particular embodiment, it is not very important to get a precise sampling time, and $t_0 - nT_s$ may be written more precisely as $t_{-n}$ (corresponding to the time of sample (−n) as compared to the time of the last sample);
- $t_0$ is the time of the last available measurement;
- n is an arbitrary number of samples (thus corresponding the amount of time) taken into account before deciding a profile switch. The greater is n, the less sensitive to noise and to variance is the system (but the slower is the system to react). An efficient value of n is such that $n*T_s$ corresponds to the characteristic relaxation time of the environment (e.g., $n*T_s$ is equal to 10 minutes);
- $\langle\ \rangle_n$ is an operator corresponding to the mean value over n samples; and
- $\{\ \}_{i \neq m}$ is an operator corresponding to the manifold gathering the set labelled by all i indices but m.

According to other embodiments, the setting controller uses an accumulation process (similar to a I-controller): accordingly, a change of profile happens only when a score difference between a profile and the current profile exceeds a threshold (denoted G). Therefore, only the best profile in average is selected (since it is the first to exceed G).

Such a heuristic can be expressed as follows:

$$\text{choose setting } x_m, \sum_{i=0}^{n} f(x_m)(t_0 - iT_s) - f(x_c)(t_0 - iT_s) > G$$

wherein $x_c$ represents the current settings and $x_i$ represents a profile of index i;

$f(x_m)(t)$ is a VCA score associated with a profile m at measurement sample time t and $f(x_i)(t)$ is a VCA score associated with a profile i at measurement sample time t. The VCA score may be the VCA relative accuracy or it can be a combination of the VCA accuracy and the VCA resource consumption in order to take into account resource consumption in the score itself;

$T_s$ is the sampling time used by measurement and controller. According to a particular embodiment, it is not very important to get a precise sampling time, and $t_0-nT_s$ may be written more precisely as $t_{-n}$ (corresponding to the time of sample (−n) as compared to the time of the last sample);

$t_0$ is the time of the last available measurement; and n is an arbitrary number of samples (thus corresponding the amount of time) taken into account before deciding a profile switch. The greater is n, the less sensitive to noise and to variance is the system (but the slower is the system to react). An efficient value of n is such that $n*T_s$ corresponds to the characteristic relaxation time of the environment (e.g., $n*T_s$ is equal to 10 minutes).

As set forth above, resource consumption (e.g., network resources and/or processing resources) may be taken into account for determining whether or not the current settings are to be changed. This may be done by adding hard constraints to the resource consumption which should stay below some threshold. In such a case, profiles which are associated with resource consumption above this threshold are rejected (i.e., they cannot be used as current settings).

According to another embodiment, resource consumption is directly integrated into the VCA score.

For example, the VCA score may be expressed as follows:

$$f(x_i)(t) = \alpha * \text{accuracy}_{VCA}(x_i)(t) + \beta * (\text{resource consumption})(x_i)(t)$$

wherein $x_i$ represents a profile of index i;

$f(x_i)(t)$ is a VCA score associated with a profile i at measurement sample time t. The VCA score may be the VCA relative accuracy or it can be a combination of the VCA accuracy and the VCA resource consumption in order to take into account resource consumption in the score itself;

α is the weight of the VCA accuracy; and

β is the weight for the VCA resource consumption.

Therefore, according to particular embodiments, a setting controller may be based on a heuristic that can be expressed as follows:

$$\text{choose setting } x_m, \sum_{i=0}^{n} f(x_m)(t_0 - iT_s) - f(x_c)(t_0 - iT_s) > G$$

with $$f(x_i)(t) = \alpha * \text{accuracy}_{VCA}(x_i)(t) + \beta * (\text{resource consumption})(x_i)(t)$$

wherein $x_c$ represents the current settings and $x_m$ represents a profile of index m;

$f(x_m)(t)$ is a VCA score associated with a profile m at measurement sample time t and $f(x_i)(t)$ is a VCA score associated with a profile i at measurement sample time t;

n is an arbitrary number of samples of the time window to take into account;

G is a threshold for changing or not settings;

α and β are the weight of the VCA accuracy and the weight for the VCA resource consumption, respectively;

$T_s$ is the sampling time used by measurement and controller;

$t_0$ is the time of the last available measurement; and $t_0-iT_s \equiv t_{-n}$, corresponds to the time of the sample of index −n before the last available sample, where $t_{-n}=t_0-iT_s$ if $T_s$ is stable.

Turning back to FIG. 4, steps 405 to 450 are repeated if at least one other subset of the set of profiles is to be tested (step 455).

Therefore, according to steps illustrated in FIG. 4, it is possible to predict VCA results for different profiles of a set of profiles and thus, to dynamically parametrize the current real-time VCA.

It is to be noted here that the sporadic sandbox-based prediction method according to which a VCA result accuracy is predicted for a set or a subset of profiles offers important advantages.

First of all, the predictions obtained according to the sporadic sandbox-based prediction method are very representative of the real results one can expect, with one minor assumption directed to the transcoding step since it is assumed that the transcoded image is a good approximate of the real image the system would have obtained. However, such an assumption is generally correct since going from high-quality or high resolution image to a low-quality or low resolution image generally gives good approximates of the real low-resolution images. For the sake of illustration, modern resolution interpolation methods such as Bicubic, or Lanczos interpolation kernels give very good results.

Moreover, alternatives have many drawbacks: as mentioned above, modifying real-time VCA settings progressively until converging toward the best settings, like real-world setting convergence, leads to instability. Indeed, changing settings takes time and requires waiting until the system is stabilized. It has been observed that a scene has time to change between two different settings tests and thus, images are not always comparable from settings to others, which may result in suboptimal choices or high instability. Finally, during auto-setting exploration, different suboptimal choices are explored. During this time, the real-time VCA is thus suboptimal, so it does not fulfil its task correctly. Therefore, by using a sandbox, testing is independent from the real-time VCA and thus, testing does not disturb the real-time VCA, preserving the system stability and accuracy.

Furthermore, resource consumption is negligible while testing many profiles that may be used as settings for the real-time VCA.

Figure 6:
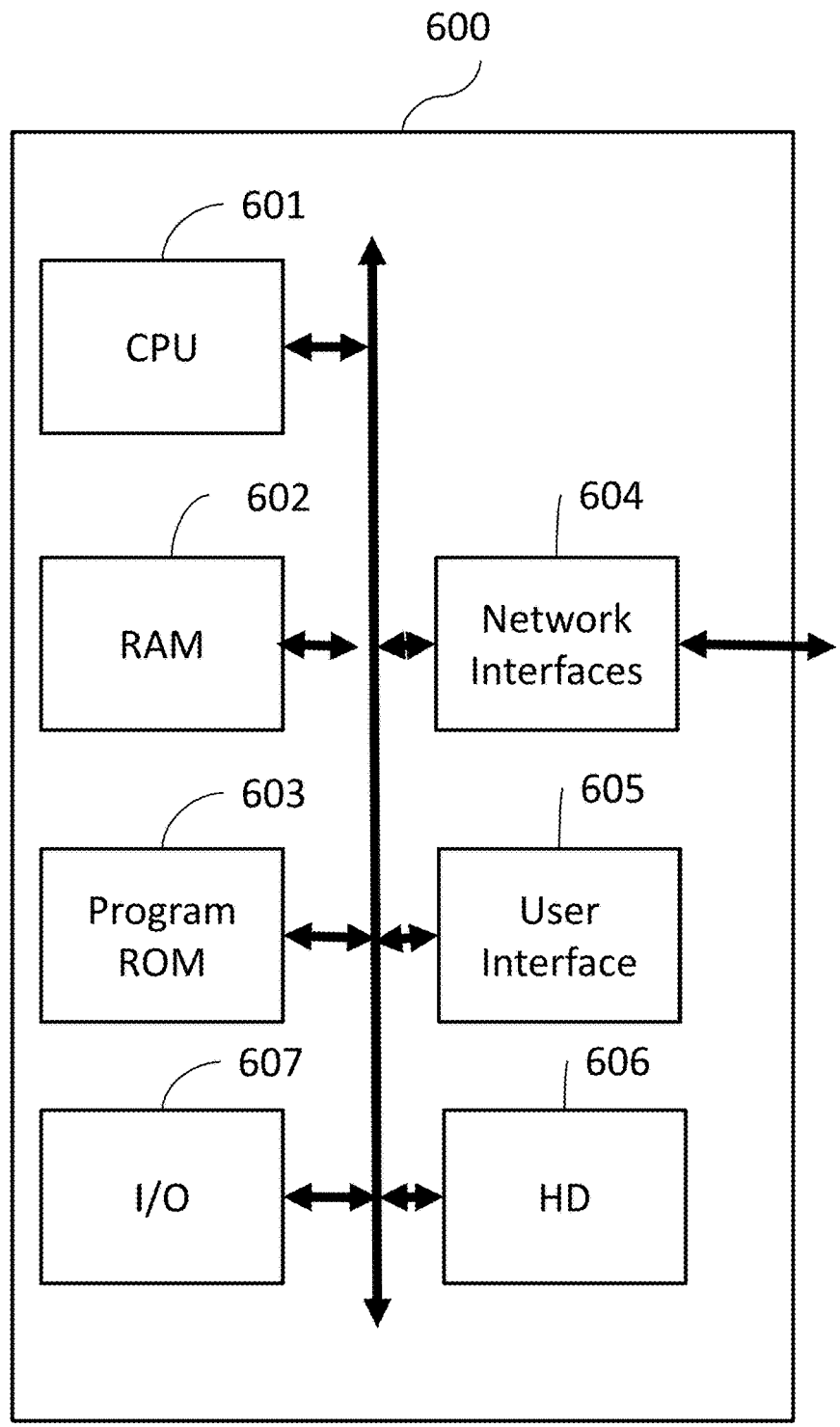
FIG. 6 is a schematic block diagram of a computing device for implementation of one or more embodiments of the invention or of parts of the invention.

FIG. 6 is a schematic block diagram of a computing device for implementation of one or more embodiments of the invention or of parts of the invention. The device may be a computer, a server (e.g. server 225 or 280 in FIG. 2), a client, or some hardware embedded within a camera (e.g. camera 212 or 222 in FIG. 2). The device 600 comprises a RAM memory 602 which may be used as a working memory for a control unit 601 configured for implementing a method according to embodiments or steps of the method according to the invention. For example, the control unit may be configured to execute instructions of a computer program loaded from a ROM memory 603. The program may also be loaded from a hard drive 606.

The device also comprises a network interface 604 which may be a single network interface, or comprise a set of network interfaces (for instance several wireless interfaces, or several types of wired or wireless interfaces). The device may comprise a user interface 605 for displaying information to a user and for receiving inputs from the user.

The device may also comprise an input/output module 607 for receiving and/or sending data from/to external devices.

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure and the appended claims.

Such variations may derive, in particular, from combining embodiments as set forth in the summary of the invention and/or in the appended claims.

In the claims, the word "comprising" does not exclude other elements or steps, and the indefinite article "a" or "an" does not exclude a plurality. A single processor or other unit may fulfill the functions of several items recited in the claims. The mere fact that different features are recited in mutually different dependent claims does not indicate that a combination of these features cannot be advantageously used. Any reference signs in the claims should not be construed as limiting the scope of the invention.

APPENDIX

TABLE 1

| settings | fps | stream |
|---|---|---|
| | quality | settings |
| | Resolution | |
| | character size | VCA settings |
| | stop criterion | |
| | threshold 1 | |
| | threshold 2 | |

TABLE 2a

| profile 1 | Fps | 25 |
|---|---|---|
| | quality | 'high' |
| | Resolution | 1080p |
| | character size | 96 pi |
| | stop criterion | 2 s |

TABLE 2a-continued

| | threshold 1 | 180 |
|---|---|---|
| | threshold 2 | 260 |

TABLE 2b

| profile 2 | Fps | 15 |
|---|---|---|
| | quality | 'low' |
| | Resolution | 720p |
| | character size | 72 pi |
| | stop criterion | 1 s |
| | threshold 1 | 120 |
| | threshold 2 | 140 |

The invention claimed is:

1. A method for parametrizing a video surveillance system comprising a current video content analytics module, a reference video content analytics module, and a video streaming component, the reference video content analytics module having higher performance than the current video content analytics module, the current video content analytics module processing video data transmitted by the video streaming component, the method comprising:
   obtaining, by the current video content analytics module, first video data having first characteristics;
   analysing the first video data having the first characteristics, by the current video content analytics module, so as to obtain a first performance value;
   obtaining, by the reference video content analytics module, second video data having second characteristics, the second video data being transmitted by the video streaming component;
   analysing the second video data having the second characteristics, by the reference video content analytics module, so as to obtain a second performance value;
   comparing the first performance value with the second performance value; and,
   adapting configuration parameters of the video surveillance system based on the comparison result.

2. The method of claim 1, wherein the adapting step comprises a step of selecting a profile among a plurality of profiles, each profile of the plurality of profiles comprising configuration parameters of the current video content analytics module.

3. The method according to claim 2,
   wherein the step of analysing the first video data having the first characteristics comprises a step of analysing the first video data for each profile of the plurality of profiles and a step of obtaining a first performance value for each profile of the plurality of profiles; and
   wherein the step of selecting a profile comprises a step of determining a profile associated with an optimal accuracy among a plurality of accuracies, each accuracy of the plurality of accuracies being associated with a different profile.

4. The method according to claim 3, wherein each accuracy of the plurality of accuracies is determined as a function of the first performance value associated with one profile and of the second performance value.

5. The method according to claim 4, further comprising a step of obtaining a level of required resources for each profile of the plurality of profiles, the step of selecting a profile being further based on a level of required resources associated with a profile of the plurality of profiles.

6. The method according to claim 4, wherein configuration parameters of the current video content analytics module are modified if the selected profile is repeatedly selected.

7. The method according to claim 4, wherein configuration parameters of the current video content analytics module are modified if a difference between a score associated with the selected profile and a score associated with the configuration parameters of the current video content analytics module is greater than a predetermined threshold.

8. The method according to claim 1, wherein the reference video content analytics module provides responses of higher quality than responses provided by the current video content analytics module.

9. The method according to claim 1, wherein the reference video content analytics module for analysing the second video data requires more resources than the current video content analytics module for analysing the first video data.

10. The method according to claim 1, wherein the first video data are derived from the second video data, the first video data being of lower quality than the second video data.

11. The method according to claim 1, wherein the first video data are transmitted by the video streaming component, the first video data being of lower quality than the second video data.

12. The method according to claim 1, wherein the steps of analysing the first video data and of analysing the second video data are carried out on a batch mode, when the current video content analytics does not process real-time data.

13. A non-transitory computer-readable storage medium storing instructions of a computer program for implementing the method according to claim 1.

14. A device for parametrizing a video surveillance system comprising a current video content analytics module, a reference video content analytics module, and a video streaming component, the reference video content analytics module having higher performance than the current video content analytics module, the current video content analytics module processing video data transmitted by the video streaming component, the device comprising a microprocessor configured for carrying out the steps of:
- obtaining, by the current video content analytics module, first video data having first characteristics;
- analysing the first video data having the first characteristics, by the current video content analytics module, so as to obtain a first performance value;
- obtaining, by the reference video content analytics module, second video data having second characteristics, the second video data being transmitted by the video streaming component;
- analysing the second video data having the second characteristics, by the reference video content analytics module, so as to obtain a second performance value;
- comparing the first performance value with the second performance value; and,
- adapting configuration parameters of the video surveillance system based on the comparison result.

15. The device claim 14, wherein the microprocessor is further configured so that the adapting step comprises a step of selecting a profile among a plurality of profiles, each profile of the plurality of profiles comprising configuration parameters of the current video content analytics module.

16. The device according to claim 15, wherein the microprocessor is further configured so that,
- the step of analysing the first video data having the first characteristics comprises a step of analysing the first video data for each profile of the plurality of profiles and a step of obtaining a first performance value for each profile of the plurality of profiles; and
- the step of selecting a profile comprises a step of determining a profile associated with an optimal accuracy among a plurality of accuracies, each accuracy of the plurality of accuracies being associated with a different profile.

17. The device according to claim 16, wherein the microprocessor is further configured so that each accuracy of the plurality of accuracies is determined as a function of the first performance value associated with one profile and of the second performance value.

18. The device according to claim 17, wherein the microprocessor is further configured so as to carry out a step of obtaining a level of required resources for each profile of the plurality of profiles, the step of selecting a profile being further based on a level of required resources associated with a profile of the plurality of profiles.

19. The device according to claim 17, wherein the microprocessor is further configured so that configuration parameters of the current video content analytics module are modified if the selected profile is repeatedly selected.

20. The device according to claim 17, wherein the microprocessor is further configured so that configuration parameters of the current video content analytics module are modified if a difference between a score associated with the selected profile and a score associated with the configuration parameters of the current video content analytics module is greater than a predetermined threshold.

* * * * *